C. F. HARTMANN.
BAKING APPARATUS.
APPLICATION FILED NOV. 10, 1909.
986,286.
Patented Mar. 7, 1911.
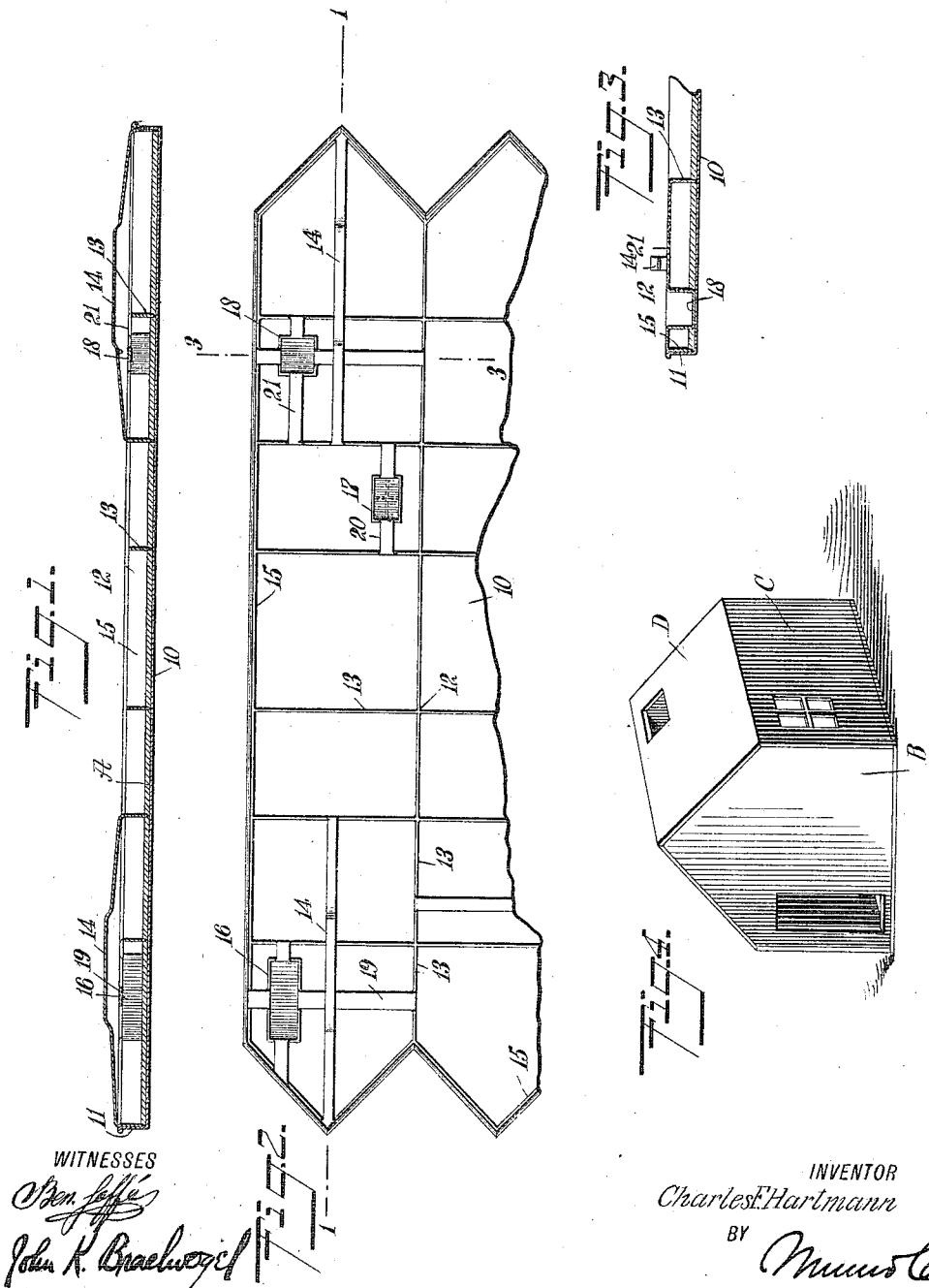
WITNESSES
INVENTOR
Charles F. Hartmann
BY
ATTORNEYS

UNITED STATES PATENT OFFICE.

CHARLES F. HARTMANN, OF NEW YORK, N. Y.

BAKING APPARATUS.

986,286.  Specification of Letters Patent.  Patented Mar. 7, 1911.

Application filed November 10, 1909. Serial No. 527,171.

*To all whom it may concern:*

Be it known that I, CHARLES F. HARTMANN, a subject of the German Emperor, and a resident of the city of New York, borough of Manhattan, in the county and State of New York, have invented a new and Improved Baking Apparatus, of which the following is a full, clear, and exact description.

This invention relates to baking apparatus intended for use in fashioning ornamental or other articles from suitably formed sections or parts of pastry or the like, and relates more particularly to apparatus of this kind comprising a pan, and a removable member associated therewith and having means for dividing a layer of dough in the pan and for maintaining the dough against malformation, due to spreading while baking.

The object of the invention is to provide simple, economical and efficient apparatus of the class described, by means of which ornamental and artistic objects of different kinds can be fashioned from pastry or the like, by means of which the articles can be baked in large quantities, at comparatively little expense and with rapidity, and by means of which it is possible to bake the various sections or pieces comprising the articles, so that they do not spread or otherwise alter their form and thereby render difficult the fashioning of the articles.

The invention consists in the construction and combination of parts to be more fully described hereinafter and particularly set forth in the claim.

Reference is to be had to the accompanying drawings forming a part of this specification, in which similar characters of reference indicate corresponding parts in all the views, and in which—

Figure 1 is a longitudinal section of an embodiment of my invention, taken on the line 1—1 in Fig. 2. Fig. 2 is a plan view of part of an apparatus of my invention; Fig. 3 is a transverse section on the line 3—3 of Fig. 2; and Fig. 4 is a perspective view showing an article, the parts of which can be baked by means of my apparatus.

Before proceeding to a more detailed explanation of my invention, it should be clearly understood that while I have shown in the accompanying drawings, for example, a form of the apparatus by means of which the sections or pieces comprising a small house can be baked, the apparatus can be so constructed that other articles can be manufactured by means of it, inexpensively and with rapidity. Needless to say, the particular form of the pieces into which the layer of dough is severed constitutes no part of my invention, and certain features can be altered in accordance with special conditions or individual preference, without departing from the underlying spirit of the invention.

I have found that in fashioning articles such as small houses, from pieces of cake, pastry or the like, it is an expensive and slow process to cut the pieces separately, bake them separately, and subsequently fasten them together by means of melted sugar or in any other suitable manner. I provide a pan in which a layer of dough is placed, and which has associated therewith a member adapted to be positioned upon the dough, and having means for sub-dividing the layer into the desired sections. The member maintains the dough against spreading while baking, so that the pieces retain the shape which is necessary for the fashioning of the article. It will be understood that if the pieces are baked separately, in the ordinary manner, they alter their forms while baking, and that it is then difficult to assemble them to form a neat and attractive article, without considerable labor in trimming or otherwise adapting the malformed pieces for the purpose.

Referring more particularly to the drawings, I provide a pan 10 of any suitable form, and as shown for example, having an upwardly disposed beaded rim 11. I employ a member 12 fashioned from cast metal or any other suitable material and having a rim adapted to fit within the pan, being slightly smaller in size than the pan, and conforming to the shape thereof. The member comprises a plurality of intersecting and parallel partitions or walls 13, the lower edges of which are preferably sharpened, so that when the member is placed upon a layer A of dough within the pan, the partitions or walls penetrate the dough and subdivide it into the desired sections. The member 12 has handles or grips 14 by means of which it can be lifted into and out of the pan, and be otherwise manipulated. The member 12 is allowed to remain in the pan while the dough is baking, and therefore the partitions 13, as well as the outer frame or wall 15 of the member serve to maintain the sections of dough against spreading while it is baking. Consequently, the resulting sections, which of course depend upon the location and relative positions of the parts of the member 12, do not vary from their predetermined, necessary dimensions.

With the form of the device shown herewith it is possible to bake various parts of a small house such as that shown in Fig. 4. These parts comprise the end walls B having tapered parts for the gable roof, the side walls C, and the roof sections D. The pan and the member are proportioned to bake the parts for a number of houses, to increase the rapidity with which the articles can be manufactured, and they may be of any size consistent with their use in ovens of the usual type. To provide door, window and chimney, or other openings in the parts B, C, and D, the member 12 may have suitably formed parts 16, 17, and 18, held in place by supports 19, 20 and 21 secured to the partitions at suitable points. The parts 16, 17 and 18, are pressed into the dough and displace the same, as is shown most clearly in Fig. 3, so that the resulting baked section has an opening of the desired form therethrough. If so desired, the member 12 may have a top or cover associated therewith, so that the dough, while baking, is completely inclosed.

Having thus described my invention, I claim as new, and desire to secure by Letters Patent:

Baking apparatus, comprising a pan, and a member removably positioned in said pan and having partitions provided with cutting edges adapted to subdivide a layer of dough within said pan, said member having parts associated with said partitions extending to the bottom of said pan, whereby they are adapted to form openings of predetermined shape and size in the layer of dough.

In testimony whereof I have signed my name to this specification in the presence of two subscribing witnesses.

CHARLES F. HARTMANN.

Witnesses:
AUGUST H. HARTMANN,
ANNI B. HARTMANN.

---

Copies of this patent may be obtained for five cents each, by addressing the "Commissioner of Patents. Washington, D. C."